United States Patent
Patel et al.

(10) Patent No.: US 10,070,390 B2
(45) Date of Patent: Sep. 4, 2018

(54) POWER MANAGEMENT OF A WIRELESS COMMUNICATION DEVICE

(71) Applicant: Telefonaktiebolaget LM Ericsson (publ), Stockholm (SE)

(72) Inventors: Bhavinkumar Patel, Malmo (SE); Masao Naruse, Tokyo (JP)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/521,292

(22) PCT Filed: Oct. 24, 2014

(86) PCT No.: PCT/EP2014/072851
§ 371 (c)(1),
(2) Date: Apr. 23, 2017

(87) PCT Pub. No.: WO2016/062351
PCT Pub. Date: Apr. 28, 2016

(65) Prior Publication Data
US 2017/0318537 A1   Nov. 2, 2017

(51) Int. Cl.
*H04M 1/00* (2006.01)
*H04B 1/38* (2015.01)
(Continued)

(52) U.S. Cl.
CPC ... *H04W 52/0248* (2013.01); *H04W 52/0245* (2013.01); *H04W 52/0251* (2013.01);
(Continued)

(58) Field of Classification Search
CPC ......... H04W 52/0248; H04W 52/0245; H04W 52/0251; H04W 52/0258; H04W 4/02;
(Continued)

(56) References Cited

U.S. PATENT DOCUMENTS

| 5,799,256 A | 8/1998 | Pombo et al. |
| 7,505,795 B1 | 3/2009 | Lim et al. |

(Continued)

FOREIGN PATENT DOCUMENTS

| WO | 2007131097 A1 | 11/2007 |
| WO | 2009134894 A2 | 11/2009 |

(Continued)

OTHER PUBLICATIONS

PCT International Search Report, dated Jun. 18, 2015, in connection with International Application No. PCT/EP2014/072851, all pages.

(Continued)

*Primary Examiner* — Nhan Le
(74) *Attorney, Agent, or Firm* — Leffler Intellectual Property Law, PLLC

(57) ABSTRACT

A power management method of a wireless communication device is disclosed. The wireless communication device comprises a modem for wireless communication and a battery for supplying power to the modem. The method comprises obtaining information regarding a power consumption of the modem as a function of time (the information being provided by the modem during wireless communication), forming power consumption statistics from the obtained information (wherein the power consumption statistics comprise an average power consumption during wireless communication as a function of one or more time parameters), and controlling use of the modem by one or more applications of the wireless communication device based on the power consumption statistics. Corresponding computer program product, arrangement and wireless communication device are also disclosed.

15 Claims, 2 Drawing Sheets

(51) Int. Cl.
*H04W 52/02* (2009.01)
*H04W 4/02* (2018.01)

(52) U.S. Cl.
CPC .......... *H04W 52/0258* (2013.01); *H04W 4/02* (2013.01); *H04W 52/0261* (2013.01); *Y02D 70/00* (2018.01); *Y02D 70/1242* (2018.01); *Y02D 70/1262* (2018.01); *Y02D 70/164* (2018.01)

(58) Field of Classification Search
CPC ............... H04W 52/0261; Y02D 70/00; Y02D 70/1262; Y02D 70/164; Y02D 70/1242
USPC .......... 455/127.1, 127.2, 522, 571, 572, 574
See application file for complete search history.

(56) References Cited

U.S. PATENT DOCUMENTS

| | | | | |
|---|---|---|---|---|
| 8,200,209 B2* | 6/2012 | Pehrsson | ............ | G01R 31/3648 320/132 |
| 8,670,503 B2* | 3/2014 | Chan | ................... | H04W 52/343 375/297 |
| 8,775,846 B2* | 7/2014 | Robinson | ................ | G06F 1/263 713/340 |
| 9,307,505 B2* | 4/2016 | Zhu | ..................... | H04W 52/243 |
| 2007/0109019 A1 | 5/2007 | Wu et al. | | |
| 2010/0233989 A1 | 9/2010 | Constien et al. | | |
| 2011/0018346 A1 | 1/2011 | Dixon | | |
| 2011/0207509 A1 | 8/2011 | Crawford | | |
| 2012/0129564 A1 | 5/2012 | De La Cropte De Chanterac | | |
| 2012/0158908 A1 | 6/2012 | Luna et al. | | |
| 2012/0210325 A1 | 8/2012 | de Lind van Wijngaarden et al. | | |
| 2013/0121194 A1 | 5/2013 | Heshmati | | |
| 2013/0227318 A1 | 8/2013 | Musial et al. | | |
| 2014/0018033 A1 | 1/2014 | Luna | | |
| 2014/0045481 A1 | 2/2014 | Fraley | | |
| 2014/0082384 A1 | 3/2014 | De Cesare et al. | | |

FOREIGN PATENT DOCUMENTS

| | | |
|---|---|---|
| WO | 2011014518 A1 | 2/2011 |
| WO | 2012109007 A1 | 8/2012 |

OTHER PUBLICATIONS

PCT Written Opinion, dated Jun. 18, 2015, in connection with International Application No. PCT/EP2014/072851, all pages.
Maruti Gupta et al., Analyzing Mobile Applications and Power Consumption on SmartPhone over LTE netowrk, Intel Labs, Hillsboro, USA, 4 pages.

* cited by examiner

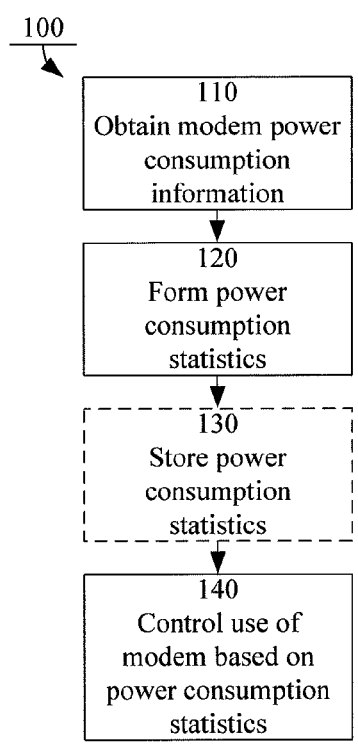
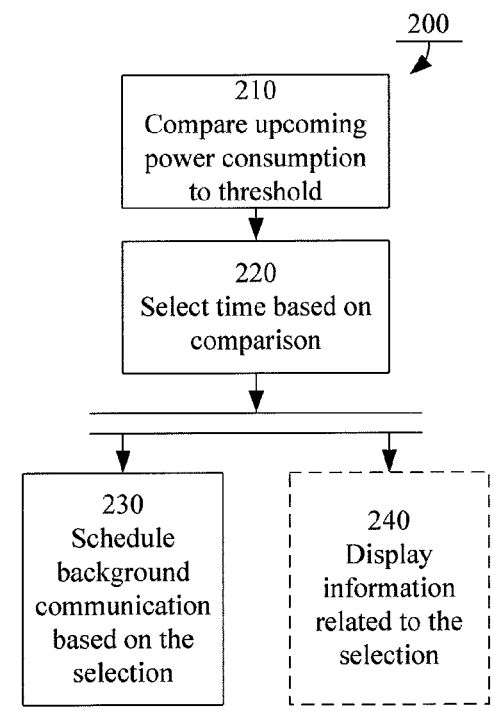
FIG. 1
FIG. 2

POWER MANAGEMENT OF A WIRELESS COMMUNICATION DEVICE

TECHNICAL FIELD

The present invention relates generally to the field of wireless communication devices. More particularly, it relates to power management of battery-powered wireless communication devices.

BACKGROUND

Keeping power consumption at a low level is generally important for battery-powered devices, and particularly so for battery-powered wireless communication devices).

US 2011/0207509 A1 discloses various embodiments for providing enhanced battery power conservation in mobile devices. The device may store user pattern data and/or user preference data. The device may include a power management module coupled to the processor. The power management module may monitor a location of the device, wireless signal strength and date/time. The power management module may also monitor and analyze user operation of the device to identify scenarios in which wireless communications can be suspended to reduce battery consumption.

US 2014/0082384 A1 discloses techniques for power management of a portable device. According to one embodiment, a user agent of an operating system executed within a portable device is configured to monitor daily battery usage of a battery of the portable device, to capture daily battery charging pattern of the battery of the portable device, and to infer user intent of utilizing the portable device at a given point in time based on a battery operating condition at the point in time in view of the daily battery usage and the daily battery charging pattern. Power management logic is configured to perform power management actions based on the user intent.

However, these power management techniques may not be adequate in all situations. For example, one or more of these power management techniques may cause power management that is either too restrictive or too indulgent in various situations.

Therefore, there is a need for alternative power management for wireless communication devices.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to provide alternative power management for wireless communication devices.

According to some embodiments, an object is to provide an approach to power management where the power consumption of a modem is controlled in relation to current radio conditions. This object may not be accurately achieved based on measurements of battery usage since the battery usage is typically not a completely adequate measure of the power consumption of the modem in relation to current radio conditions. Furthermore, this object may not be accurately achieved by power management based on location, wireless signal strength and date/time since these parameters typically do not fully describe the power consumption of the modem in relation to current radio conditions.

A first aspect is a power management method of a wireless communication device comprising a modem for wireless communication and a battery for supplying power to the modem.

The method comprises obtaining information regarding a power consumption of the modem as a function of time (the information being provided by the modem during wireless communication), forming power consumption statistics from the obtained information, wherein the power consumption statistics comprise an average power consumption during wireless communication as a function of one or more time parameters, and controlling use of the modem by one or more applications of the wireless communication device based on the power consumption statistics.

Obtaining information regarding the power consumption of the modem may be performed according to any suitable known or future method. For example, the information may be obtained by receiving the information (or an indication thereof) from the modem via an operative connection (e.g. a communication bus).

The information regarding the power consumption of the modem may, for example, comprise one or more power consumption values of the modem (e.g. a power level and duration of an active state), a time indication, and (possibly) a geographical location indication.

Forming power consumption statistics based on the power consumption information may be performed according to any suitable known or future method. Forming power consumption statistics may comprise forming new power consumption statistics and/or update already existing power consumption statistics.

For example, forming the power consumption statistics may comprise calculating one or more typical (e.g. average) power consumption values of the modem and tag them with typical characteristics of circumstances under which the typical power consumption value is applicable to the modem. Such typical characteristics may, for example comprise one or more corresponding time parameters (based on the time indications, e.g. time of day, day of week, season, etc.) and possibly one or more corresponding geographical location parameters (based on the geographical location indications, e.g. a geogaphical area or position). In some embodiments, the geographical location parameters may constitute typical routes traveled by the wireless communication device.

Controlling use of the modem may, for example, comprise optimizing, minimizing or decreasing the power consumption of the modem compared to if no power management was applied or compared to another power management approach.

Controlling use of the modem based on the power consumption statistics may, for example, comprise predicting one or more upcoming power consumption values, using the predicted upcoming power consumption values to determine when it is suitable (in relation to power consumption) that applications use the modem, and controlling the applications accordingly.

Predicting the upcoming power consumption values may, for example, be performed by comparing a current time indication and/or a current geographical location indication with time parameters and/or geographical location parameters of the power consumption statistics and determining a probable route traveled by the wireless communication device. Typical routes may be indicated by the power consumption statistics (e.g. as explained above). Once the probable route is determined, an upcoming power consumption value may be predicted by extracting, from the power consumption statistics, a corresponding typical (e.g. average) power consumption value associated with an upcoming geographical location or time indication of the route.

In some embodiments, controlling use of the modem may comprise causing communication of the one or more applications to take place at a first time when the average power consumption during wireless communication is less than a threshold value.

In some embodiments, controlling use of the modem may comprise scheduling communication, autonomously initiated by the wireless communication device, of the one or more applications at the first time. The communication autonomously initiated by the wireless communication device may, for example, comprise non-user-initiated communication or background communication.

In some embodiments, controlling use of the modem may comprise scheduling communication, autonomously initiated by the wireless communication device, of the one or more applications during a single wake-up period of the wireless communication device associated with the first time.

In some embodiments, controlling use of the modem may comprise presenting, via a user interface of the wireless communication device, information regarding a second time when starting of an application is suitable based on the power consumption statistics. The second time may be the same as, or different from, the first time. Examples of applications in this context include synchronization actions, backup actions, etc.

In some embodiments, the method may further comprise obtaining the information regarding the power consumption of the modem as a function of a geographical location of the wireless communication device and forming the power consumption statistics from the obtained information, wherein the power consumption statistics comprise an average power consumption during wireless communication as a function of one or more geographical location parameters.

In some embodiments, the obtained information may comprise a power consumption level of the modem and a duration of an active state of the modem. The method may further comprise calculating an energy consumption of the modem based on the power consumption level of the modem multiplied by the duration of the active state of the modem. The duration of the active state of the modem may, for example, refer to a time period during which the modem is switched on, e.g. (fully) powered, for performing a communication action. In some embodiments, different energy consumptions may be calculated for transmission by the modem and for reception of the modem. The energy consumption of the modem may be comprised in the power consumption statistics.

According to some embodiments, controlling use of the modem by one or more applications of the wireless communication device may be further based on a remaining energy of the battery.

The method may, according to some embodiments, further comprise storing the statistical power consumption data in a database. The database may be comprised in the wireless communication device or may be external to the wireless communication device.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

A third aspect is a power management arrangement for a wireless communication device, wherein the wireless communication device comprises a modem for wireless communication and a battery for supplying power to the modem. The arrangement of the third aspect comprises a processor adapted to perform (or at least cause performance of) method steps according to the first aspect.

A fourth aspect is a power management arrangement for a wireless communication device, wherein the wireless communication device comprises a modem for wireless communication and a battery for supplying power to the modem. The arrangement comprises an information obtainer, a statistical unit and a controller.

The information obtainer is adapted to obtain information regarding a power consumption of the modem as a function of time, the information being provided by the modem during wireless communication.

The statistical unit is adapted to form power consumption statistics from the obtained information, wherein the power consumption statistics comprise an average power consumption during wireless communication as a function of one or more time parameters.

The controller is adapted to control use of the modem by one or more applications of the wireless communication device based on the power consumption statistics.

In some embodiments, the controller may be adapted to control use of the modem by causing communication of the one or more applications to take place at a first time when the average power consumption during wireless communication is less than a threshold value.

In some embodiments, the controller may comprise a scheduler adapted to schedule communication, autonomously initiated by the wireless communication device, of the one or more applications at the first time.

According to some embodiments, the controller may be adapted to cause presentation, via a user interface of the wireless communication device, information regarding a second time when starting of an application is suitable based on the power consumption statistics.

The information obtainer may, according to some embodiments, be further adapted to obtain the information regarding the power consumption of the modem as a function of a geographical location supplied by a geographical positioning unit. The statistical unit may be further adapted to form the power consumption statistics from the obtained information, wherein the power consumption statistics comprise an average power consumption during wireless communication as a function of one or more geographical location parameters.

In some embodiments, the obtained information may comprise a power consumption level of the modem and a duration of an active state of the modem. The arrangement may further comprise a calculator adapted to calculate an energy consumption of the modem based on the power consumption level of the modem multiplied by the duration of the active state of the modem.

The controller may, in some embodiments, be further adapted to control use of the modem by one or more applications of the wireless communication device based on a remaining energy of the battery.

The arrangement may further comprise a database adapted to store the statistical power consumption data according to some embodiments.

A fifth aspect is a wireless communication device comprising the arrangement of any of the third and fourth aspects.

In some embodiments, the third, fourth and fifth aspects may additionally have features identical with or corresponding to any of the various features as explained above for the first aspect.

An advantage of some embodiments is that, since the use of the modem is controlled based on the power consumption of the modem, the control will be more efficient than if use of the modem was controlled based on some other power consumption value (e.g. a battery output power).

Another advantage of some embodiments is that, since the information regarding the power consumption is supplied by the modem, it will be more accurate than if it was estimated (e.g. by measuring signal strength).

BRIEF DESCRIPTION OF THE DRAWINGS

Further objects, features and advantages will appear from the following detailed description of embodiments, with reference being made to the accompanying drawings, in which:

FIG. 1 is a flowchart illustrating example method steps according to some embodiments;

FIG. 2 is a flowchart illustrating example method steps according to some embodiments;

DETAILED DESCRIPTION

Figure 3:
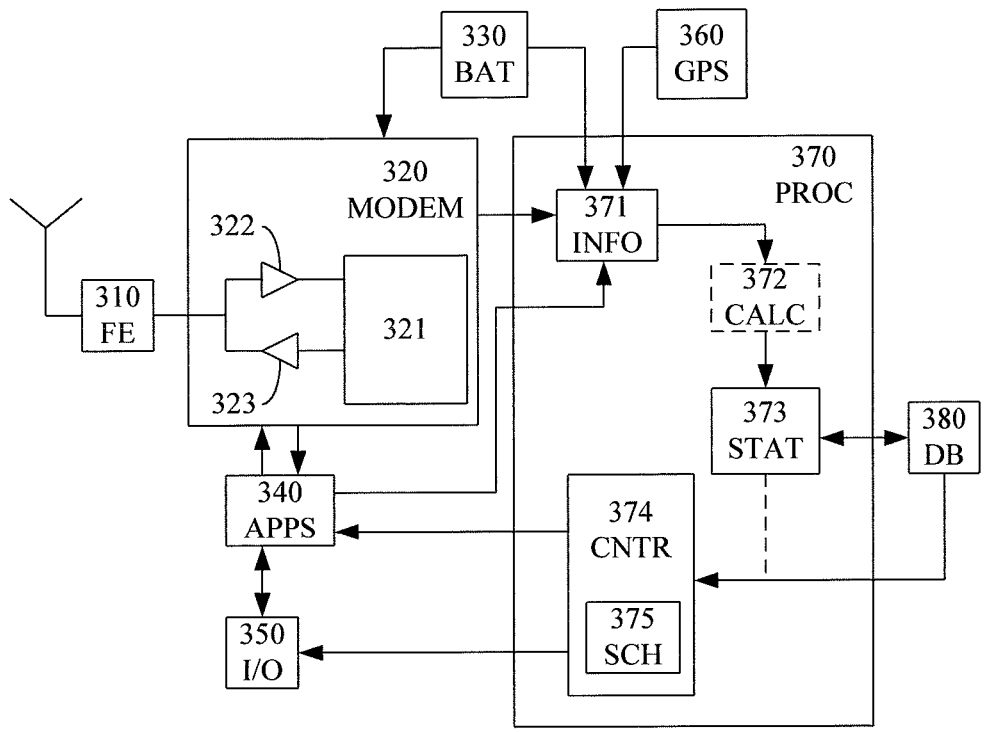
FIG. 3 is a block diagram illustrating an example arrangement according to some embodiments.

In the following, embodiments will be described where efficient power management is provided for a wireless communication device comprising a modem for wireless communication and a battery for supplying power to the modem.

The power management may comprise controlling use of the modem by one or more applications of the wireless communication device based on power consumption statistics.

Controlling use of the modem may, for example, comprise scheduling communication, autonomously initiated by the wireless communication device (e.g. background communication), of the applications at times when it is expected that the power consumption required for the communication is relatively low.

In some embodiments, controlling use of the modem may comprise scheduling as much as possible of the above communication during a single wake-up period of the modem. This has the benefit of minimizing the extra power consumption required at the start and end of a wake-up period.

Controlling use of the modem may, alternatively or additionally, comprise informing a user of the wireless communication device of times when it is expected that the power consumption required for certain communication is relatively low, so that the user is enable to select an appropriate time to initiate such communication.

The power consumption statistics typically comprise a plurality of typical (e.g. average) power consumption values of the modem.

Each typical power consumption value may be associated with one or more corresponding time parameters. For example, one typical power consumption value may be associated with week days and a certain time of the day, and another typical power consumption value may be associated with summer weekends.

Furthermore, each typical power consumption value may be associated with one or more corresponding geographical location parameters. For example, a typical power consumption value may be associated with a certain geographical location (which may be comprised in a route, e.g. a sequence of geographical locations, associated the power consumption statistics).

Combinations of the above may also be considered. For example, one typical power consumption value may be associated with a certain geographical location (which may be part of a route), a certain time of the day, and week days.

Controlling use of the modem based on power consumption statistics may comprise predicting one or more upcoming power consumptions. An upcoming power consumption value may be predicted as a typical power consumption value of the power consumption statistics, wherein the typical power consumption value is selected based on a current time and/or geographical location. The current time and/or geographical location may, fir example, enable identification of a route of the power consumption statistics and the typical power consumption value may be selected as the typical power consumption value associated with an upcoming geographical location (and/or time) of the route. Given the one or more upcoming power consumptions use of the modem may be controlled such that communication takes place when/where the corresponding required power consumption is expected to be as low as possible (or at least acceptably low).

The power consumption statistics may be formed from information (e.g. data) provided by the modem regarding power consumption. Such information may comprise a momentary power consumption value and may have a corresponding time indication and/or a corresponding geographical location indication. The power consumption statistics may be formed (and updated) based on the momentary power consumption value. For example, one or more typical (e.g. average, filtered, etc.) power consumption values may be computed associated with various time indications and/or geographical location indications.

FIG. 1 illustrates an example power management method 100 according to some embodiments. The method 100 may, for example, be carried out by a wireless communication device comprising a modem for wireless communication and a battery for supplying power to the modem.

The method starts in step 110 where modem power consumption information is obtained from the modem as explained above. The information regarding power consumption of the modem may be obtained as a function of time and/or geographical location.

The power consumption information (e.g. data) may be provided by the modem and obtained by an arrangement performing the method 110 via any suitable provision means (e.g. a data bus). The information may, for example, comprise a momentary power consumption value and may have a corresponding time indication and/or a corresponding geographical location indication.

In some embodiments, the obtained information of step 110 may comprise a power consumption level of the modem and a duration of an active state of the modem. Then, the method 100 may further comprise calculating an energy consumption of the modem based on the power consumption level of the modem multiplied by the duration of the active state of the modem.

In step 120, power consumption statistics is formed based on the power consumption information of step 110 as explained above. The power consumption statistics may comprise one or more typical (e.g. average) power consumption values for wireless communication associated with one or more time parameters (e.g. time of day, day of week, month, season, etc.) and/or one or more geographical location parameters (e.g. route).

The power consumption statistics may be stored in a database, which may or may not be comprised in the wireless communication device, as illustrated by optional step 130.

In step 140, use of the modem by one or more applications of the wireless communication device is controlled based on the power consumption statistics as explained above.

For example, controlling use of the modem may comprise scheduling communication, autonomously initiated by the wireless communication device, of the one or more applications at a time when power consumption is low. In some embodiment, controlling use of the modem may comprise scheduling communication, autonomously initiated by the wireless communication device, of the one or more applications during a single wake-up period of the wireless communication device.

Alternatively or additionally, controlling use of the modem may comprise presenting, via a user interface of the wireless communication device, information regarding a time when starting of an application is suitable based on the power consumption statistics (e.g. when the power consumption is low).

According to some embodiments, controlling use of the modem may be further based on a remaining energy of the battery. For example, a particularly restrictive use of the modern may be applied if the remaining energy of the battery is below a certain level.

FIG. 2 illustrates an example power management method 200 according to some embodiments. For example, the method 200 may be performed as part of step 140 of FIG. 1.

In step 210, one or more predicted upcoming power consumption values to a threshold and a time is selected in step 220 based on the comparison. The threshold may be static or dynamic. In some embodiments, several times may be selected.

For example, the method 200 may be applied to control use of the modem by causing communication of the one or more applications to take place at a time when the average power consumption during wireless communication is less than a threshold value.

For example, a plurality of typical power consumption values associated with a route traveled by the wireless communication device may be compared to the threshold and a time is selected among those corresponding to typical power consumption values falling below the threshold (e.g. the lowest one).

In step 230, background communication is scheduled based on the selection. For example, the background communication may be scheduled at (or in association with) the selected time as explained above.

In optional step 240 (which may be performed in parallel to, or in sequence with, step 230), information related to the selection is displayed for the user of the wireless communication device. For example, the selected time may be indicated as suitable to initiate certain applications as explained above.

FIG. 3 schematically illustrates an example power management arrangement according to some embodiments. The arrangement may, for example, be comprised in a wireless communication device comprising a modem (MODEM) 320 for wireless communication and a battery (BAT) 330 for supplying power to the modem.

The modem is operatively connected to an antenna arrangement via transceiver front-end (FE) 310. The modem may comprise any suitable components as understood by the skilled person, e.g. a low-noise amplifier (INA) 322, a power amplifier (PA) 323 and other circuitry 321.

The arrangement comprises an information obtainer (INFO) 371, a statistical unit (STAT) 373 and a controller (CNTR) 374, e.g. comprised in a processor (PROC) 370.

The information obtainer 371 is adapted to obtain (compare with step 110 of FIG. 1) information regarding power consumption of the modem 320, associated with a time indication. The information obtainer 371 may also be adapted to associate the information regarding power consumption with a geographical indication received from a geographical positioning unit (GPS) 360.

The statistical unit 373 is adapted to form (compare with step 120 of FIG. 1) power consumption statistics from the obtained information. In some embodiments, the arrangement may further comprise a calculator (CALC) 372 adapted to calculate the energy consumption of the modem for forming the power consumption statistics based on a power consumption level of the modem multiplied by a duration of the active state of the modem. The arrangement may further comprise a database (DB) 380 adapted to store compare with step 130 of FIG. 1) the statistical power consumption data according to some embodiments.

The controller 374 is adapted to control (compare with step 140 of FIG. 1) use of the modem 320 by one or more applications (APPS) 340 of the wireless communication device based on the power consumption statistics.

For example, the controller 374 may be adapted to control use of the modem 320 by causing communication of the one or more applications 340 to take place at a time when the average power consumption during wireless communication is less than a threshold value. The controller 374 may comprise a scheduler (SCH) 375 adapted to schedule communication, autonomously initiated by the wireless communication device, of the one or more applications 340 at the selected time.

Alternatively or additionally, the controller 374 may be adapted to cause presentation, via a user interface (I/O) 350, information regarding a time when is suitable, based on the power consumption statistics, to initiate an action associated with the one or more applications 340.

According to some embodiments, the battery life time (e.g. time between charges) of a wireless communication device may be improved by utilizing knowledge of a traveling pattern (e.g. daily routes) of the wireless communication device Power management of battery powered wireless communication devices often involves techniques for reducing the power consumption by various components in the wireless communication device.

Power management systems are typically structured starting from the battery and other hardware components (CPU, memory, display, modem, etc.), via operating system, middleware and application, up to the user being the initiator of activities at the very top level.

While a user typically initiates many of the actions causing power consumption (e.g. by starting an application, toughing the screen, typing a key, etc. a user typically does not know how (e.g. at what power level) the power will be consumed. A typical example is wireless network access, where the user is typically not aware of which amount of power an action will consume since there may be large variations due to varying radio conditions.

One object of embodiments of the invention is to reduce power consumption when the wireless communication device employs wireless communication.

Power consumption patterns of a wireless communication device show that applications (e.g. widgets) intermittently (and autonomously) access the wireless communication capabilities of the device. While such applications are initiated by the user at the very beginning, the user typically does not have any control of the wireless communication (which may consume significant amounts energy from the battery) thereafter.

Typical techniques for reducing power consumption consider reducing a time component of a communication action, assuming that the power level is constant. However, it is typically more efficient to reduce power consumption by considering a combination of time and power level, since the power level of a modem is typically highly dependent on the radio conditions.

The duration of time during which the battery is operational largely relates to the energy consumption E, which is the integral of the power consumption P(t) over time t, or equivalently:

$$E=\Sigma_{\forall t} P(t)t.$$

The transmission related energy consumption and the reception related energy consumption may, respectively, be expressed as:

$$E_{tx}\Sigma_{\forall t_{tx}}P_{tx}(t_{tx})t_{tx} \text{ and } E_{rx}=\Sigma_{\forall t_{rx}}P_{rx}(t_{rx})t_{rx},$$

where $t_{tx}$ is the time required for transmission and $t_{rx}$ is the time required for reception, and generally, the communication related energy consumption may be expressed as $E=E_{tx}+E_{rx}$.

The time components typically depend on the communication activities and on application demand. Typical power management solutions only consider the application demand to reduce the time component, while energy consumption also depend on the power component and on how long the modem has to be operating to complete a specific application task (which may be related to the power component).

The time component $t_{rx}$ is typically not application controlled, but depends on operator network configurations of various network timers.

The power components $P_{tx}$ and $P_{rx}$ typically depend on the radio conditions between the wireless communicating device and the network node serving the device. A major contributor to the transmission power consumption is the power amplifier (PA) and the radio frequency (RF) transmission path. A major contributor to the reception power consumption is the low-noise amplifier (LNA). The LNA power is typically changed in relation to the received signal-to-noise ratio.

Since most network node locations are geographically fixed, the radio conditions (and thereby the transmission power and the reception power) are typically highly dependent on the geographical location of the wireless communication device.

Thus, according to some embodiments, the daily (or otherwise time-related) movements of the wireless communication device are tracked together with power/energy consumption parameters to provide power consumption statistics. Based on the power consumption statistics, background communication access of applications may be automatically optimized to achieve lower power/energy usage than application-autonomous and/or randomized access.

The user may also be notified when (in time) and where (in location) it might be suitable, from a power/energy perspective, to execute data calls.

According to some example embodiments, the wireless communication device employs a wireless communication component (e.g. comprising a modem). The wireless communication component may be operatively connected to a host system comprising system processor, memories, display, human interface protocols, etc. The wireless communication component is used by the system processor for accessing application servers located beyond a serving network node to enable application software, which runs on the system processor, to communicate with the application servers.

The wireless communication component may autonomously record power consumption information for, e.g.:
Radio uplink transmission power
Radio receiving duration for one connection
Geographical location
Timing of data calls initiated by the user For example, logging of power consumption information may occur when one or more of the following conditions are fulfilled: when a communication transaction starts, when high output power is needed, when a pre-defined time (e.g. 10 minutes) has elapsed during a transaction.

Radio uplink transmission power may be calculated as follows for a wireless communication component compliant with UMTS-LTE (Universal Mobile Telecommunication Standard, Long Term Evolution):

For the uplink data channel and for the uplink control channel, $P_{PUSCH}$ and $P_{PUCCH}$ (normally time multiplexed) may be used, respectively (see e.g. Third Generation Partnership Project—3GPP—TS36.213 section 5.1):

$$P_{PUSCH}(i)=\min\{P_{CMAX},10\log_{10}(M_{PUSCH}(i))+P_{O\_PUSCH}(j)+\alpha(j)\cdot PL+\Delta_{TF}(i)+f(i)\}$$

$$P_{PUCCH}(i)=\min\{P_{CMAX},P_{O\_PUCCH}+PL+h(n_{CQI},n_{HARQ})+\Delta_{F\_PUCCH}(F)+g(i)\}$$

If they are not time multiplexed but simultaneous, max ($P_{PUSCH}$, $P_{PUCCH}$) may be used as a parameter. An average power $P_{av}$ calculation for the time period t may be expressed as:

$$P_{av}(t) = \sum_{k=1}^{t} \max(P_{PUSCH,k}, P_{PUCCH,k})/tn$$

where n is the number of uplink channels transmitted at the same time.

Radio receiving duration for one connection may be recorded based on a receiving frequency bandwidth as follows:
Average network connection time is recorded when the wireless communication device enters connected mode which is defined in 3GPP specifications (t_av_c).
Average reception time is recorded for network connection (t_av_r).
Average data traffic is recorded for network connection (t_av_t).
Reception power level is recorded (together with radio receiving duration or independently).

The geographical location may be obtained by any suitable method for position/location detection, for example, Global Positioning Service—GPS, Global Navigation Satellite Service—GNSS, Observed Time Difference Of Arrival—OTDOA (see e.g. 3GPP TS36.355).

Timing of a data call initiated by the user may be obtained by recording the time of initiation of any user-initiated traffic. For example, a time stamp of start and/or end of transaction for outgoing calls (and not incoming calls) may be used. An end of transaction for data calls may be determined by network disconnection suggested by the network (normally based on a tinier expiration, e.g. due to no traffic).

The recorded information may be reported to a scheduler application of the host system. The scheduler application may be system software or hardware that has the task of scheduling background activity for applications and/or other activities (e.g. user activities). The scheduler application may store the data autonomously recorded by the wireless communication component Typical, the scheduler application composes a heuristic engine that aggregate the following information:
  WHEN the operation happened
  HOW power was consumed during transmission
  HOW power was consumed during reception
  WHERE, in terms of geographical location, the operation was performed
  WHEN the data call was initiated by the user, if applicable.

Operational flow of the heuristic engine may comprise:
Maintaining statistics of geographical location patterns of the wireless communication device as a function of time (e.g. during the day).
Determining movement routes of the statistics as a function of time daily routes).
Attaching obtained energy/power parameters to the geogaphical locations and time indications of the routes.
Attaching notations of user-initiated data calls to the geographical locations and time indications of the routes.
Tracking any new movement and either creating a new branch/route and adding it to the route list or updating parameters of an existing branch/route as necessary.

The heuristic engine may synchronize the information to determine power hungry geographical locations and/or times. The heuristic engine may also determine any particular needs of the user to initiate a data call (e.g. if a data call is always initiated at a certain time/location).

The scheduler application uses the outcome of the heuristic engine to try to use the times/locations where power consumption is low, and schedule background application operations based on the information provided.

An example of scheduling activity comprises:
Tracking the current mobility of the wireless communication device.
Identifying the route based on the statistics (if found in the list from the heuristic engine).
Identifying location(s)/time(s) that are un-suitable for wireless communication (e.g. due to high required transmission power) based on the power/energy parameters attached to the route.
Scheduling communication based on the identification by avoiding (or at least reducing) background communication at location(s)/time(s) that are un-suitable for wireless communication.
Suggesting the user to make data calls at location(s)/times(s) that are suitable for wireless communication.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook or a mobile gaming device.

Figure 4:
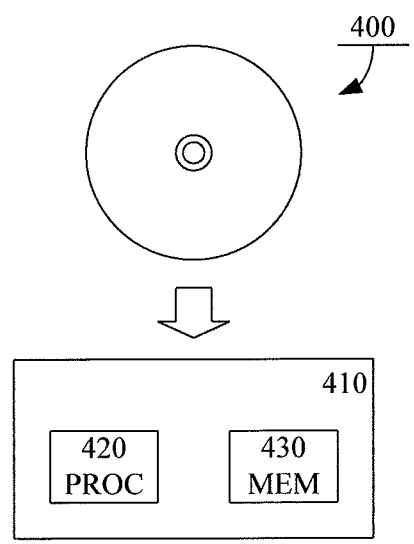
FIG. 4 is a schematic drawing illustrating a computer program product according to some embodiments.

According to some embodiments, a computer program product comprises a computer readable medium such as, for example, a USB-stick, a plug-in card, an embedded drive, a diskette or a CD-ROM (as illustrated by the example computer program product 400 of FIG. 4). The computer readable medium may have stored thereon a computer program comprising program instructions. The computer program may be loadable into a data-processing unit (PROC) 420, which may, for example, be comprised in a wireless communication device 410. When loaded into the data-processing unit 420, the computer program may be stored in a memory (MEM) 430 associated with or integral to the data-processing unit 420. According to some embodiments, the computer program may, when loaded into and run by the data-processing unit, cause the data-processing unit to execute method steps according to, for example, the methods shown in any of the FIGS. 1-2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A power management method of a wireless communication device comprising a modem for wireless communication and a battery for supplying power to the modem, the method comprising:
  obtaining information regarding a power consumption of the modem as a function of time, the information being provided by the modem during wireless communication;
  forming power consumption statistics from the obtained information, wherein the power consumption statistics comprise an average power consumption during wireless communication as a function of one or more time parameters; and controlling use of the modem by one or more applications of the wireless communication device based on the power consumption statistics, wherein controlling use of the modem comprises:

causing communication of the one or more applications to take place at a first time when the average power consumption during wireless communication is less than a threshold value; and presenting, via a user interface of the wireless communication device, information regarding a second time when starting of an application is suitable based on the power consumption statistics.

2. The method of claim 1, wherein controlling use of the modem comprises scheduling communication, autonomously initiated by the wireless communication device, of the one or more applications at the first time.

3. The method of claim 2, wherein controlling use of the modem comprises scheduling communication, autonomously initiated by the wireless communication device, of the one or more applications during a single wake-up period of the wireless communication device associated with the first time.

4. The method of claim 1, further comprising obtaining the information regarding the power consumption of the modem as a function of a geographical location of the wireless communication device, and forming the power consumption statistics from the obtained information, wherein the power consumption statistics comprise an average power consumption during wireless communication as a function of one or more geographical location parameters.

5. The method of claim 1, wherein the obtained information comprises a power consumption level of the modem and a duration of an active state of the modem, the method further comprising calculating an energy consumption of the modem based on the power consumption level of the modem multiplied by the duration of the active state of the modem.

6. The method of claim 1, wherein controlling use of the modem by one or more applications of the wireless communication device is further based on a remaining energy of the battery.

7. The method of claim 1, further comprising storing the statistical power consumption data in a database.

8. A nontransitory computer readable medium, having thereon a computer program comprising program instructions, the computer program being loadable into a data-processing unit and adapted to cause execution of a power management method of a wireless communication device when the computer program is run by the data-processing unit, wherein the wireless communication device comprises a modem for wireless communication and a battery for supplying power to the modem, wherein the method comprises:

obtaining information regarding a power consumption of the modem as a function of time, the information being provided by the modem during wireless communication;

forming power consumption statistics from the obtained information, wherein the power consumption statistics comprise an average power consumption during wireless communication as a function of one or more time parameters; and controlling use of the modem by one or more applications of the wireless communication device based on the power consumption statistics, wherein controlling use of the modem comprises:

causing communication of the one or more applications to take place at a first time when the average power consumption during wireless communication is less than a threshold value; and presenting, via a user interface of the wireless communication device, information regarding a second time when starting of an application is suitable based on the power consumption statistics.

9. A power management arrangement of a wireless communication device, wherein the wireless communication device comprises a modem for wireless communication and a battery for supplying power to the modem, the arrangement comprising:

an information obtainer adapted to obtain information regarding a power consumption of the modem as a function of time, the information being provided by the modem during wireless communication;

a statistical unit adapted to form power consumption statistics from the obtained information, wherein the power consumption statistics comprise an average power consumption during wireless communication as a function of one or more time parameters; and a controller adapted to control use of the modem by one or more applications of the wireless communication device based on the power consumption statistics, wherein:

the controller is adapted to control use of the modem by causing communication of the one or more applications to take place at a first time when the average power consumption during wireless communication is less than a threshold value; and the controller is adapted to cause presentation, via a user interface of the wireless communication device, information regarding a second time when starting of an application is suitable based on the power consumption statistics.

10. The arrangement of claim 9, wherein the controller comprises a scheduler adapted to schedule communication, autonomously initiated by the wireless communication device, of the one or more applications at the first time.

11. The arrangement of claim 9, wherein the information obtainer is further adapted to obtain the information regarding the power consumption of the modem as a function of a geographical location supplied by a geographical positioning unit and wherein the statistical unit is further adapted to form the power consumption statistics from the obtained information, wherein the power consumption statistics comprise an average power consumption during wireless communication as a function of one or more geographical location parameters.

12. The arrangement of claim 9, wherein the obtained information comprises a power consumption level of the modem and a duration of an active state of the modem, the arrangement further comprising a calculator adapted to calculate an energy consumption of the modem based on the power consumption level of the modem multiplied by the duration of the active state of the modem.

13. The arrangement of claim 9, wherein the controller is further adapted to control use of the modem by one or more applications of the wireless communication device based on a remaining energy of the battery.

14. The arrangement of claim 9, further comprising a database adapted to store the statistical power consumption data.

15. A wireless communication device comprising the arrangement of claim 9.

\* \* \* \* \*